UNITED STATES PATENT OFFICE.

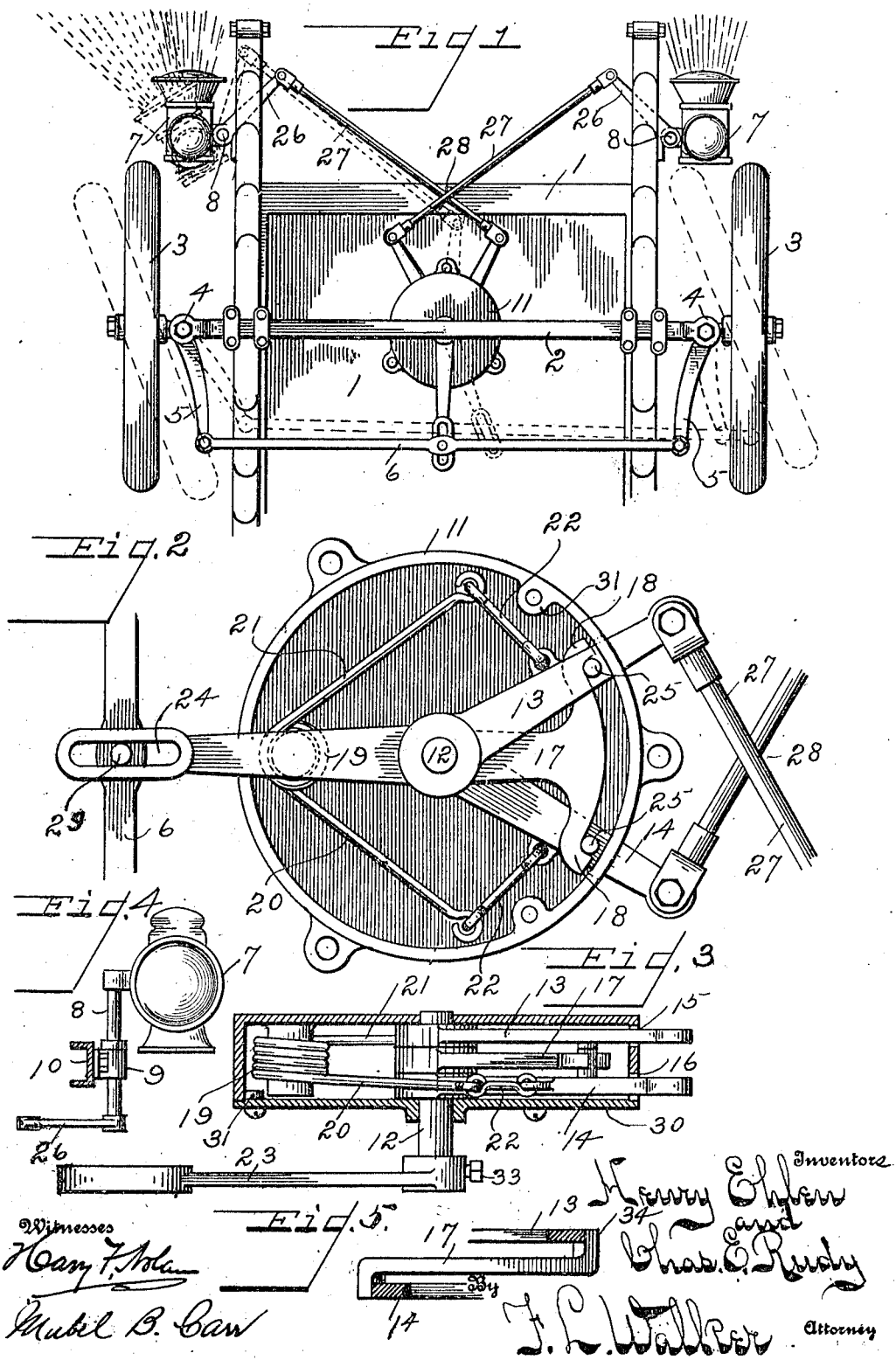

HENRY EHLEN AND CHARLES E. RUDY, OF COVINGTON, OHIO, ASSIGNORS OF ONE-THIRD TO WILLIAM B. MEEKER, OF DAYTON, OHIO, AND SAID RUDY ASSIGNOR TO SAID EHLEN.

AUTOMATIC CONTROLLING DEVICE FOR VEHICLE-LAMPS.

950,615.     Specification of Letters Patent.     Patented Mar. 1, 1910.

Application filed October 30, 1908. Serial No. 460,370.

*To all whom it may concern:*

Be it known that we, HENRY EHLEN and CHARLES E. RUDY, both citizens of the United States, residing at Covington, in the county of Miami and State of Ohio, have invented certain new and useful Improvements in Automatic Controlling Devices for Vehicle-Lamps, of which the following is a specification.

Our invention relates to vehicles and particularly to a means for automatically controlling lamps carried on vehicles, whereby the shaft of light cast by the lamps will be immediately varied with each deviation of the vehicle from a straight path.

The object of the invention is to provide a controlling device for such purpose which will not only be simple in structure, but also cheap in construction, efficient in use, adapted to operate automatically by the guiding movement of the vehicle gear, and unlikely to get out of repair.

With the above primary and other incidental objects in view, as will more fully appear in the specification, the invention consists of the features of construction, the parts and combinations thereof and mode of operation, or their equivalents, as hereinafter described and set forth in the claims.

In the drawings, Figure 1 is a bottom plan view of the forward portion of an automobile showing, in solid lines, the normal position of the lamps and other parts, while in dotted lines, one lamp is shown in its adjusted position to which it is moved in unison with the movement of the guiding wheels to the position indicated also by dotted lines. Fig. 2 is a plan view of the controller device. Fig. 3 is a vertical sectional view of the controller. Fig. 4 is a detail view of the lamp and its connections. Fig. 5 is a detail view of a modification.

Referring to the drawings, 1 is the body of the vehicle of which 2 is the front axle, 3 are the guiding wheels swiveled at 4 and provided with the levers 5 which levers are connected by the connecting rod 6 in the usual manner, well known in automobile construction. Each lamp 7 is supported on a vertical shaft 8 journaled in a bearing 9 on the frame 10 of the vehicle body. The controller device comprises a casing 11 preferably circular in form attached to the under side of the vehicle body. Journaled in the frame 11 is a shaft or trunnion 12 on which are loosely pivoted two independent levers 13 and 14. The levers 13 and 14 project beyond the casing 11 through slotted openings 15 and 16 in the forward periphery of the casing 11 and adapted to limit the outward or return movement of the levers 13 and 14 and the action of the spring 21. Secured upon the shaft or trunnion 12 intermediate the two levers 13 and 14 and adapted to move with said shaft or trunnion 12, is a control member 17 comprising a radial arm from which project, in opposite directions, lateral hook shaped extensions 18. There is also located within the casing 11 a helical spring 19 terminating in two spring arms 20 and 21 which are connected by links 22 with the levers 14 and 13 respectively and hold these levers against the wall of the casing 11 at the outermost edges of the slots 15 and 16 respectively, in which locations the levers hold the lamps so as to direct the rays of light straight ahead. Secured upon the shaft or trunnion 12 outside the casing 11 is a lever 23 having therein a slotted opening 24 engaging a pin 29 in the connecting bar 6. It is obvious that other forms of connection between the lever 23 and the bar 6 may be provided which would operate equally as well, however, the form shown is the preferred form. In each of the levers 13 and 14 is a stud 25 engaged by the hook shaped arm 18 on the control member 17 whereby the movement of the control member 17 will cause a similar movement of one of said levers, independent of the other. Secured to the lower end of the shaft 8 upon which the lamp 7 is supported is the lever 26 which is connected by a link or connecting rod 27 with one of the levers 13 and 14.

It is to be understood that there is a lamp 7 mounted on each side of the vehicle as is customary. The levers 26 of the respective lamp shafts are connected by the links 27 with the lever of the control device farthest from it, thus causing the links 27 to cross, as at 28. The connections between the control device and lamps are so adjusted, that as long as the vehicle travels in a straight path the shafts of light from both lamps will be directed straight ahead of the vehicle in the line of travel. However, upon movement of the steering apparatus whereby the guiding wheels will be deflected, one of the lamps, that on the side to which the vehicle is being turned, will be immediately adjusted to cast its shaft of light in the direction to which the guiding wheels are directed, while the remaining light continues as before to cast its light in line with the body of the vehicle. This is found to be particularly desirable in turning dark corners, as, when the lamps are rigidly secured to the body of the vehicle, the light is not directed to the new path of travel until the entire vehicle has been turned, whereas by the controller herein described, one of the lights will move in unison with the wheels while the other light will be directed with the body. The light which is varied with the wheels will depend upon the direction of variation of the steering apparatus, thus when the vehicle turns to the left the light to the left will be turned with the wheels, or upon turning to the right, the right hand light will be likewise varied and the left will remain stationary upon the vehicle body. This is accomplished through the connection of the control device of the steering apparatus. Each variation of the guiding wheels produce a reciprocatory movement of the connecting rod 6 which, through its connections with the lever 23 by means of the pin 29 and the slotted opening 24 causes an oscillating movement of the shaft or trunnion 12 in the casing 11. The oscillation of the shaft 12 will not directly affect the lever 13 or lever 14, but will cause a corresponding oscillation of the control member 18 which in turn will engage the corresponding lever. Upon oscillation of the control member 17 the hook shaped extension 18 will engage with the stud 25 of one of the independent levers and move said lever in unison with the control member 18 and shaft 12 independent of the remaining lever.

Referring particularly to Fig. 2, if the steering apparatus is moved in such direction that the bar 6 in said view will move toward the observer, it will cause the control member 17 to move away from the observer as arranged in the view. The control member through the hook shaped extension 18 engaging with the stud 25 of the lever 14 will carry the said lever 14 with it against the tension of the spring 19 while the lever 13 will remain at rest, the opposite hook shaped extension 18 moving away from and to a position beyond the lever 13 which will not be affected thereby. An opposite movement of the parts would cause the lever 13 to be operated while the lever 14 would remain at rest. The oscillation of the levers 13 and 14 thus described is transmitted through the link 27 to the lever 26 which causes oscillation of the lamp shaft 8, and thereby varies the adjustment of the lamp in unison with the guiding wheels. The casing 11 is formed in two parts, the lower side 30 being removable to permit the assembling of the device. The side 30 is secured to the main casing by means of lugs 31 on the interior of the casing which are engaged by screws. The exterior of the casing is provided with lugs by which the device may be secured to the vehicle body.

In Fig. 5, which is a detail front view of a modification of the control member 17, is illustrated a construction in which the extremities of the control member extensions 34 are turned at right angles, to engage the respective levers directly, thus obviating the necessity of the studs 25 in said levers. While the controlling device forming the subject matter hereof has been shown and described in connection with an automobile it is not limited to such use, but may be applied to other vehicles, as well; for instance, horse drawn vehicles, in which case the lever 23 may be adjusted to a position at right angles to that shown in Figs. 1 and 2 by means of the set screw 33 engaging the shaft 12 and said lever 23 may be engaged with the axle of the vehicle, the movement of which would produce the same result as afore described. The device is also applicable to traction cars in which the control device may be carried on the body of the car and the lever 23 connected with the rear or forward portion of the truck, or the arrangement may be reversed and the control device carried on the truck while the lever is connected with the body of the vehicle. The invention, is therefore, not limited to use with automobiles alone, but to any vehicle having relatively movable body and guiding wheels.

From the above description it will be apparent that there is thus produced a device of the character described possessing the particular features of which before enumerated as desirable and which is susceptible of modification in its form, proportion, detail construction, and arrangement of parts, without departing from the principle involved or sacrificing any of its advantages.

Having thus described our invention we claim:

1. In a construction as described, a vehicle body, a steering apparatus, two pivotally mounted lamps, connections between the said lamps and the steering apparatus including independent radial levers mounted on a common trunnion and adapted to positively control the movement of the lamps, and links extending between the radial levers and the pivotal supports of the lamps, and means to independently actuate the said radial levers by the movement of the steering apparatus whereby one of said lamps will be turned on its pivotal connection in unison with the steering apparatus while the other lamp will remain at rest, substantially as specified.

2. In a construction as described, a vehicle body, a steering apparatus, two adjustably mounted lamps, means for controlling said lamps by the movement of the steering apparatus including two radially mounted levers capable of independent oscillation about their pivotal points, links connecting the respective radial levers with the corresponding lamps whereby said lamps will be independently adjusted according to the direction of movement of said steering apparatus, substantially as specified.

3. In a construction as described, the combination with a relatively movable vehicle body, a steering apparatus, of two oscillating shafts, lamps carried on said shafts, levers on said shafts, independent links pivoted to said levers and adapted to be independently reciprocated by the movement of the steering apparatus, whereby the movement of the steering apparatus will cause a corresponding oscillation of the lamp supporting shaft upon the side to which the vehicle is turned to direct said lamp in the line of travel while the other lamp remains at rest, substantially as specified.

4. In a construction as described, the combination with a relatively movable body and steering apparatus, of two pivotally mounted lamps, a lamp controlling member comprising a trunnion, two independent levers pivoted on said trunnion, an actuating member adapted when moved in one direction to engage one of said levers and move same in its pivotal connection, and when moved in the opposite direction to engage and move the other of said levers, connections between the said levers and lamps, and means for moving said actuating member with the movement of the steering apparatus, substantially as specified.

5. In a construction as described, adjustably mounted lamps, a control device for said lamps, comprising a trunnion, two levers loosely mounted on said trunnion, an actuating member adapted when moved in opposite directions from normal position to alternately engage and move said levers, each independent of the other, links connecting said levers with said lamps, whereby the movement of either of said levers will cause a corresponding oscillation of the lamp connecting therewith, substantially as specified.

6. In a construction as described, adjustably mounted lamps, a control device for said lamps comprising a frame, independent levers mounted in said frame, an actuating member also pivoted in said frame, and adapted to independently move said levers about their pivotal connections according to the direction of movement of said actuating member, links connecting the levers and lamps, whereby said lamps will be independently adjusted according to the direction of movement of the actuating member, substantially as specified.

7. In a construction as described, adjustably mounted lamps, a control device for said lamps, comprising a frame, independent levers pivoted within said frame, an actuating member also pivoted within said frame, hook shaped arms on said actuating member, studs in said levers with which said arms engage, whereby upon oscillation of said actuating member the engaged lever will move with said actuating member independent of the other lever; and connections between said levers and lamps, substantially as specified.

8. In a construction as described, adjustable lamps, a control device therefor comprising a frame, independent levers pivoted in said frame and radially movable about a common point, an actuating member adapted to engage either of said levers and move it independent of the remaining lever, and connections between said levers and lamps whereby said lamps will be independently adjusted, substantially as specified.

9. In a construction as described, adjustable lamps, a control device therefor comprising a frame, independent levers pivoted on a common trunnion within said frame, an actuating member adapted to engage either of said levers and move it independent of the remaining lever, spring arms connected with said levers and adapted to return the levers to normal position, connections between said levers and lamps whereby said lamps will be automatically adjusted by the movement of said actuating member, substantially as specified.

10. In a construction as described, a vehicle, adjustable lamps carried thereon, a control device for said lamps comprising a frame, independent levers radially mounted in said frame on a common trunnion, means operated by the deviation of the vehicle from a straight line to engage and move either of said levers independent of the remaining lever, and connections between said levers and lamps, whereby the adjustment of said lamps will be varied with each deviation of the vehicle from the straight path of travel, substantially as specified.

In testimony whereof, we have hereunto set our hands this 18th day of September A. D. 1908.

HENRY EHLEN.
CHARLES E. RUDY.

Witnesses:
HARVEY J. HAKE,
ROWLAND C. BOGGS.